United States Patent

[11] 3,628,432

[72] Inventor Helmut Ettischer
 Esslingen, Germany
[21] Appl. No. 855,542
[22] Filed Sept. 5, 1969
[45] Patented Dec. 21, 1971
[73] Assignee Eastman Kodak Company
 Rochester, N.Y.
[32] Priority Sept. 28, 1970
[33] Germany
[31] P 17 97 450.4

[54] FILM METERING MECHANISM
 7 Claims, 3 Drawing Figs.
[52] U.S. Cl. ............................................................ 95/31 FM
[51] Int. Cl. ................................................................ G03b 1/62
[50] Field of Search ............................................. 95/31 FM

[56] References Cited
 UNITED STATES PATENTS
1,828,205 10/1931 Schmitt et al. ................. 95/31 (FM)

Primary Examiner—John M. Horan
Assistant Examiner—Russell E. Adams, Jr.
Attorneys—Robert W. Hampton and Milton S. Sales ABSTRACT: A film metering mechanism for cameras using film having spaced perforations at predetermined metering intervals, the mechanism including a film-advancing member and a sensing member adapted to engage a perforation to control film transport. A continuous biasing force is applied to the film-sensing member so as to resiliently urge it in a direction to intercept and engage a respective perforation as the film is advanced. An additional biasing force is applied to the film-sensing member to transiently increase the total biasing force only during operation of the film-advancing member. Thus, in order to disengage the film-sensing member from a perforation for whatever purpose, it is necessary to overcome only the continuous biasing force.

PATENTED DEC 21 1971 3,628,432

HELMUT ETTISCHER
INVENTOR.

BY Milton S. Sales
Robert W. Hampton
ATTORNEYS 3,628,432

FILM METERING MECHANISM

BACKGROUND OF THE INVENTION

1. Field of the Invention

This invention relates to devices for metering film in rollfilm cameras, and more particularly, relates to such devices used in conjunction with rollfilm that is perforated at predetermined metering intervals.

2. Description of the Prior Art

Devices for metering successive rollfilm exposures by arresting the film winding mechanism in response to the sensing of perforations or notches precut in the film at specifically chosen intervals are old and well known in the photographic art. Devices of this kind generally comprise sensing members, such as pawls or similar members, which positively rest on the film under spring pressure. When a perforation is reached, the sensing members engage the perforation and arrest further film advance by means of intermediate members which prevent further movement of the transport handle.

After the photographic exposure, the sensing member must be disengaged from the perforation before the film can be transported to the next frame. Disengagement can be accomplished by the shutter release member of the camera or by the procedures taking place in the camera after the release member has been depressed. In both situations, the total spring force on the sensing member urging it into the film perforations must be overcome, resulting in extreme cases in undesirably rough and abrupt release operation.

SUMMARY OF THE INVENTION

It is an object of the present invention to provide a new and improved mechanism for metering film in a camera utilizing film discontinuities at predetermined intervals.

It is another object of the present invention to provide a film-metering mechanism with a film-sensing member which is normally urged towards the film by a small biasing force and which is urged towards the film by a greater biasing force only when film is being advanced.

In a preferred embodiment of the present invention, a camera adapted to receive rollfilm having perforations at predetermined metering intervals is provided with a film-sensing member movable to engage a perforation to prevent, or aid in preventing, film advance. Spring means coupled to the sensing member provide a continuous biasing force for resiliently urging the sensing member in a direction to engage a perforation. Means are also provided for applying an augmenting biasing force to the sensing member in said direction. Means are provided for coupling the augmenting biasing force means to the sensing member to increase the total biasing force on the sensing member when the sensing member is moving into engagement with a perforation but not when the sensing member is moving out of engagement with the perforation, whereby in order to disengage the control means from the perforation, it is necessary to move said sensing member in opposition to only said continuous biasing force.

DESCRIPTION OF THE PREFERRED EMBODIMENT

Figure 1:
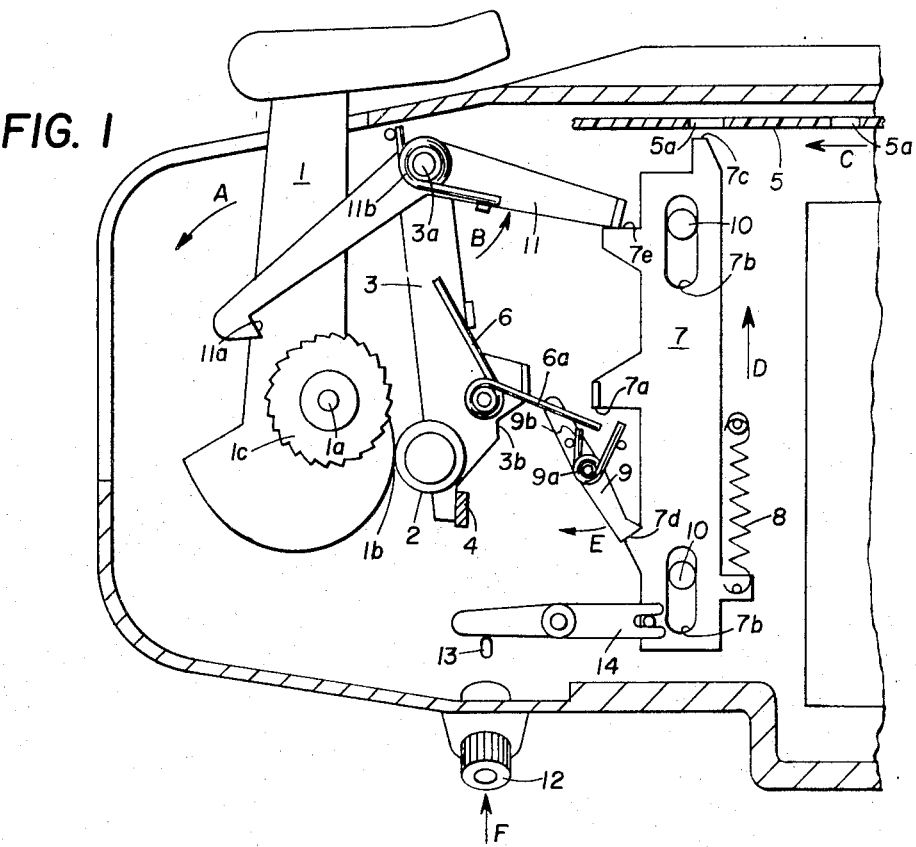
FIG. 1 is a top schematic view in section showing the camera mechanism of the instant invention after shutter release has occurred.

Because photographic cameras are well known, the present description will be directed in particular to elements forming part of, or cooperating more directly with, the present invention, camera elements not specifically shown or described herein being understood to be selectable from those known in the art.

Referring to the drawing, a camera is shown having a film transport lever 1 pivoted at 1a. Transport lever 1 carries a cam portion 1b and a ratchet wheel 1c which rotate therewith. Means, not shown but well known in the art, are provided for advancing the film in the direction of arrow C when transport lever 1 is rotated in the direction of arrow A.

The surface of cam portion 1b is contacted by a roller 2 carried by a lever 3 pivoted at 3a. Lever 3 engages a member 4 which is moved thereby for cocking other operational mechanisms such as the shutter control parts, also not shown but well known in the art. An augmenting spring 6 having a first leg 6a is carried by lever 3, the operation of spring 6 being set forth in detail hereinafter. Lever 3 has an abutment surface 3b.

A film sensing member 7 is biased in the direction of arrow D towards film 5 by weak coil spring 8. Sensing member 7 is mounted for sliding movement by pin-slot connections 7b, 10. Sensing member 7 has three abutments 7a, 7e and 7d and a film sensing finger 7c.

A lever 9 is pivotally mounted at 9a and is urged in a counterclockwise direction by a spring 9b. In the position shown in FIG. 1, lever 9 engages abutment 7d to hold sensing lever 7 away from film 5 against the force of spring 8.

A latching lever 11 has a pawl 11a which cooperates with ratchet 1c to arrest rotation of transport lever 1. Latching lever 11 is pivotally mounted at 3a and is biased in a clockwise direction by a spring 11b. An arm of lever 11 rests on abutment 7e of sensing member 7.

Operation

In FIG. 1, the camera parts are shown positioned as they would be after an exposure has been made and before film 5 has been advanced to the next frame. In order to advance the film in the direction of arrow C, transport lever 1 is manually rotated about pivot 1a in the direction of arrow A. Simultaneously, cam portion 1b moves roller 2 to rotate lever 3 about pivot 3a in the direction of arrow B. As transport lever 1 passes a predetermined angular position, leg 6a of augmenting spring 6, mounted on lever 3, moves into abutment with projection 7a of sensing member 7 to thereafter supply a biasing force additional to the continuous biasing force of retaining spring 8 acting in the direction of arrow identified at D. When lever 3 is further displaced in the direction of arrow B by means of the transport lever 1, pawl 9 is rotated in the direction of arrow E by abutment 3b of lever 3 acting against the bias of restoring spring 9a (cooperating with pawl 9), thereby releasing the sensing member 7 at abutment 7d.

Figure 2:
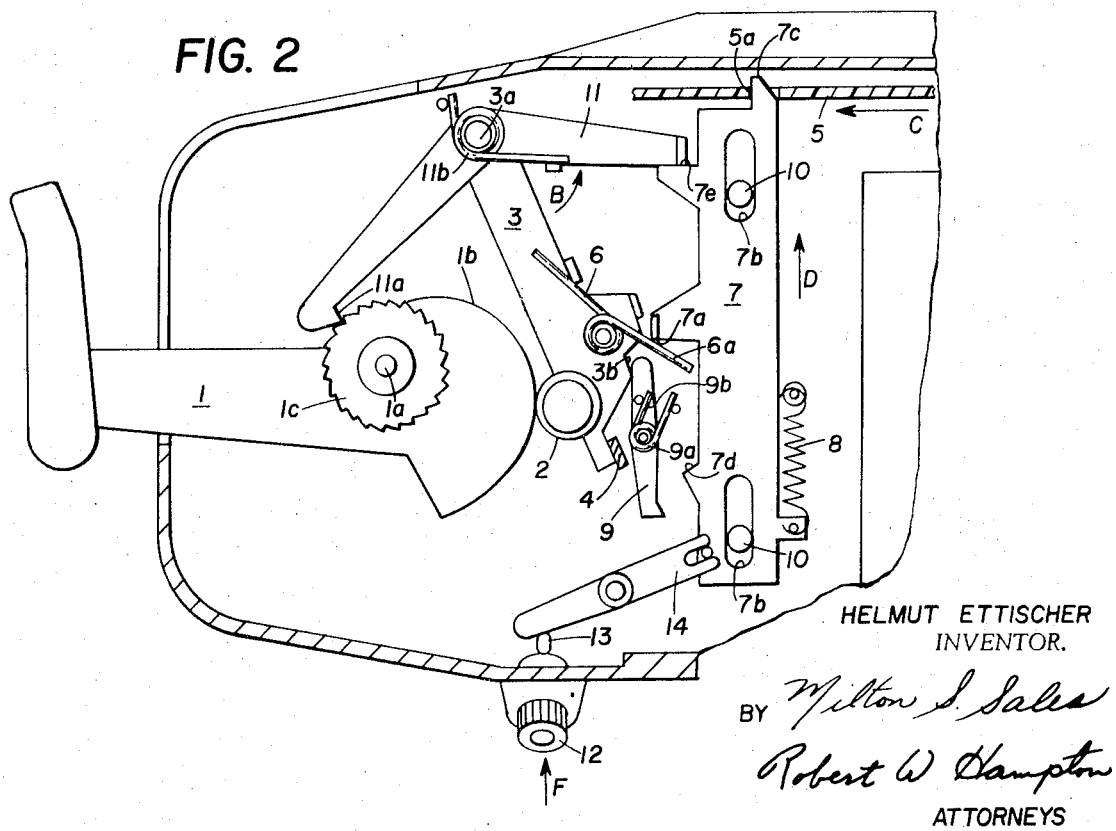
FIG. 2 is a view similar to FIG. 1 showing the camera cocked with the film winding handle being outwardly extended.

Sensing member 7, by its pin-slot connections 10, 7b can now move in the direction as indicated by the arrow D under the combined disciplines of the two springs 6 and 8, until finger 7c rests on the film 5. Latching lever 11 has been rotated counterclockwise, but pawl 11a is not yet in engagement with ratchet wheel 1c. As the film is further advanced in the direction of arrow C, sensing finger 7c aligns with a perforation such as 5a in film 5. Latching lever 11 is now further rotates by projection 7e on the sensing member 7 about its center of rotation 3a until its pawl 11a engages ratchet wheel 1c which is rigidly connected to transport lever 1. Transport lever 1 can now be rotated only in a clockwise direction and further film advance is prevented. During the latter stage of the rotary movement of transport lever 1, cam roll follower 2 of the lever 3 rolls down that portion of cam 1b having a decreasing radius so that spring 6 is not further tensioned. The various components of the camera mechanism have now advanced to the respective positions shown in FIG. 2.

Figure 3:
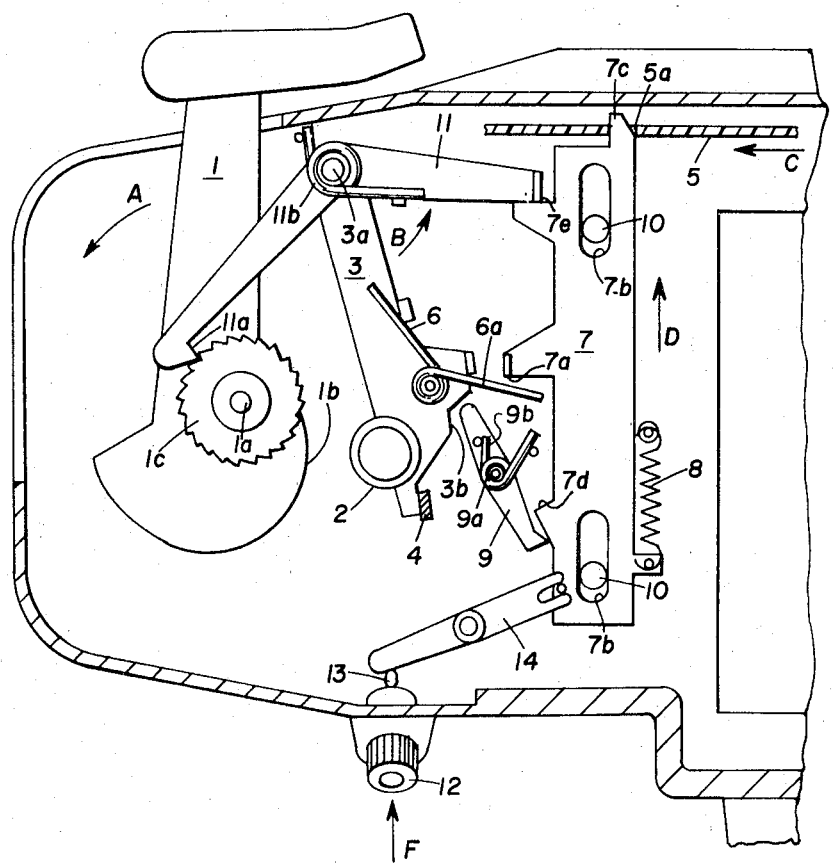
FIG. 3 is a view similar to FIGS. 1 and 2 showing the film winding handle returned to its rest position.

When transport lever 1 is returned to its initial position, as shown in FIG. 3, the camera is ready to take a picture. As will be readily observed in FIG. 3, roll follower 2 of lever 3 is not longer in abutment with cam portion 1b of transport lever 1, also leg 6a of spring 6 does not press against abutment 7a of sensing member 7. Upon the subsequent actuation of shutter release member 12 in the direction of arrow F, the sensing member 7 is moved out of film perforation 5a against the biasing action of spring 8 by the cooperation of deflection means 13, 14 until lever 9, under the bias action of spring 9a, is locked in mating engagement with abutment 7d. Since the tension of spring 6 has been relieved, only the weak holding force o spring 8 need be overcomed to move member 7. For this reason, the shutter release action of the camera is smooth and vibrationless so that the operations can take place in a failsafe way without any risk of blurring the photographic image by camera movement.

During this action, locking lever 11 which is under the bias action of spring 11b, is kept contiguous with abutment 7e of sensing member 7, this causing pawl 11a to be disengaged from ratchet wheel 1c. Pawl 11a releases transport lever 1 of the transport system for another film advancing operation, as shown in FIG. 1.

The invention has been described in detail with particular reference to a preferred embodiment thereof, but it will be understood that variations and modifications can be effected within the spirit and scope of the invention.

I claim:

1. In a camera for use with film having discontinuities spaced at predetermined metering intervals, said camera including means for advancing film in said camera and a film-sensing member movable into and out of engagement with a film discontinuity to control said film-advancing means, the improvement comprising:
   a. means for applying a continuous biasing force to said film-sensing member in a direction to move said film-sensing member into engagement with a discontinuity; and
   b. means for applying an additional biasing force to said film-sensing member in said direction only during operation of said film-advancing means, said film-sensing member being movable out of engagement with a discontinuity in opposition to only said continuous biasing force.

2. In a camera for use with film having discontinuities spaced at predetermined metering intervals, said camera including means for advancing film in said camera and a film-sensing member movable into and out of engagement with a film discontinuity to control said film-advancing means, the improvement comprising:
   a. means for applying a continuous biasing force to said film-sensing member in a direction to move said film-sensing member into engagement with a discontinuity;
   b. means actuable for applying an additional biasing force to said film-sensing member in said direction only during operation of said film-advancing means; and
   c. means for applying a third force to said film-sensing member to overcome said continuous biasing force to withdraw said film-sensing member from a discontinuity.

3. The improvement as defined in claim 2 wherein:
   a. said means for advancing film in said camera comprises a transport lever movable in a direction to advance the film; and
   b. said means for applying said additional biasing force to said film-sensing member is actuable in response to movement of said transport lever in the direction to advance the film.

4. The improvement as defined in claim 2 wherein:
   a. said means for advancing film in said camera comprises a transport lever movable in a direction to advance the film; and
   b. said means for applying an additional biasing force to said film-sensing member comprises a spring movable into engagement with said film-sensing member to apply said additional biasing force thereto, and means for moving said spring into engagement with said film-sensing member in response to movement of said transport lever to advance film.

5. In a camera for use with film having discontinuities spaced at predetermined metering intervals, said camera including means for advancing film in said camera and a film-sensing member movable into and out of engagement with a film discontinuity to control said film-advancing means, the improvement comprising:
   a. means for applying a continuous biasing force to said film-sensing member in a first direction to move said film-sensing member into engagement with a discontinuity;
   b. a transport lever forming at least part of said film-advancing means and movable in a second direction to advance the film;
   c. spring means movable into tensioned engagement with said film-sensing member for applying an additional biasing force to the film-sensing member in said first direction; and
   d. means for interconnecting said transport lever and said spring means for moving said spring means into tensioned engagement with said film-sensing member only when said transport lever is moved in said second direction.

6. The improvement as defined in claim 5 wherein said interconnecting means comprises:
   a. lever means drivingly coupled to said spring means; and
   b. cam means interconnecting said transport lever and said lever means for moving said lever means upon movement of said transfer lever to advance film.

7. In a camera for use with film having discontinuities at predetermined metering intervals, said camera including a film-sensing member movable into and out of engagement with a film discontinuity to control film advancement and shutter operator means, the improvement comprising:
   a. means for applying a continuous biasing force to said film-sensing member in a direction to move said film-sensing member into engagement with a discontinuity;
   b. means for applying an additional biasing force to said film-sensing member in sad direction when the film is being advanced; and
   c. means for disabling said additional force apply means during operation of said shutter operator means.

* * * * *